May 23, 1961

A. H. BOBECK 2,985,768

MAGNETIC TRANSLATING CIRCUIT

Filed Jan. 22, 1958

INVENTOR
A. H. BOBECK
BY
William H. Kamstra
ATTORNEY

United States Patent Office 2,985,768
Patented May 23, 1961

2,985,768

MAGNETIC TRANSLATING CIRCUIT

Andrew H. Bobeck, Chatham, N.J., assignor to Bell Telephone Laboratories, Incorporated, New York, N.Y., a corporation of New York Filed Jan. 22, 1958, Ser. No. 710,565
12 Claims. (Cl. 307—88)

Figures 1, 3:
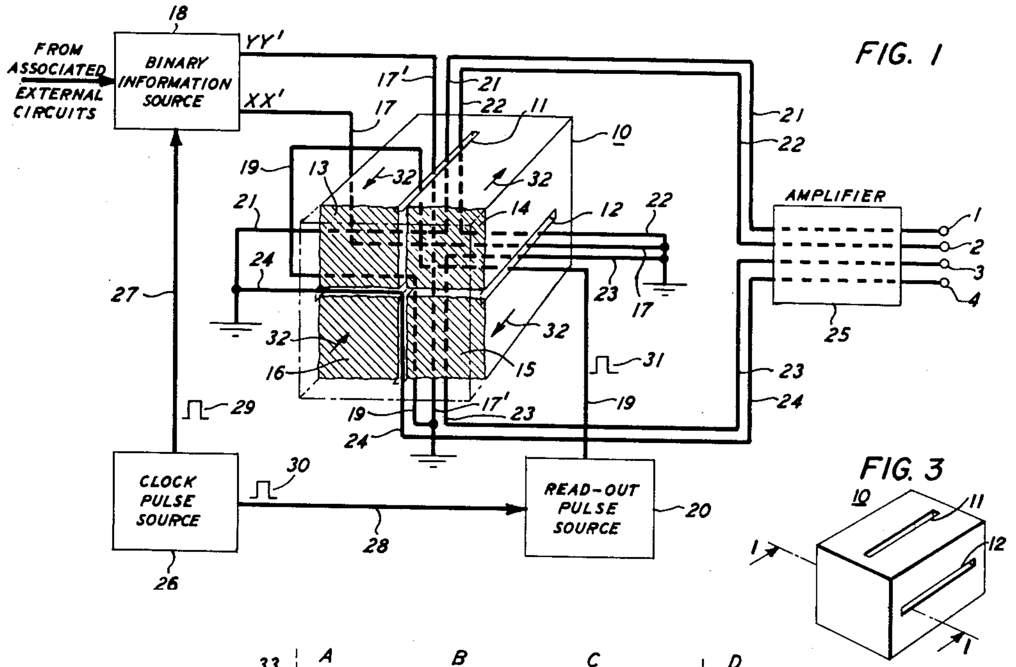

This invention relates to translation circuits and more particularly to circuits for translating information from one system of notation to another by means of magnetic devices.

The advantages of toroidal cores of ferromagnetic materials displaying substantially rectangular hysteresis characteristics in connection with performing various switching and translation functions is old and well known. The ability of these elements to remain in either of two conditions of remanent magnetization to which driven by an applied magnetomotive force makes them ideally suited, for example, for the permanent storage of binary information values represented by the two remanent magnetic states. By combining a number of such toroidal elements with suitable associated circuitry, the core elements may be driven to, or set, in particular combinations of the two remanent magnetic states to represent information groups in one system of notation and then simultaneously switched, or reset, to produce output signals in the associated circuitry representative of the same information groups in another system of notation.

Such translation or switching circuits utilizing magnetic cores are well known in the art and generally the number of cores determines the range of translations possible with the particular circuit. In one well-known arrangement, for example, eight cores are provided to accomplish a translation from a three-bit binary code to a one-out-of-eight decimal code. Each of the cores has inductively coupled thereto, either by threading or by winding on the core itself, a plurality of switching conductors to which current pulses are applied to produce the switching magnetomotive forces. Obviously such an arrangement, although accomplishing a desired switching or translation function, is complex and not readily adapted to easy manufacture or assembly. The number of core elements required to accomplish a particular translation function in the typical arrangement referred to precludes the highest degree of economy and reliability in the operation of such an arrangement. Thus, for example, in the well-known arrangement referred to, since a translation to a one-out-of-eight decimal code is performed, eight cores together with the associated wiring are required.

Accordingly it is an object of this invention to accomplish the translation of information from one system of notation to another in a simpler, more economical manner.

Another object of this invention is to translate information from one system of notation to another by means of a new and novel switching device.

It is also an object of this invention to provide a new and novel magnetic information storage element.

The foregoing objects of this invention are realized in one embodiment thereof comprising a solid of a magnetic material exhibiting a substantially rectangular hysteresis characteristic. Switching conductors lying in intersecting planes divide the solid into a number of discrete magnetic paths or legs, the conductors being either integrally associated with the magnetic solid or passed through slots provided therein. In the specific embodiment of this invention to be described in detail hereinafter a pair of such slots orthogonally intersect the magnetic solid to form four magnetic sections or legs. Passing through the slots are a pair of information input conductors intersecting each other at substantially right angles, to which conductors current pulses of either polarity may be applied. The current pulses may be representative of binary information values and, when simultaneously applied to the input conductors, produce a resultant magnetic field in accordance with known magnetic principles.

It is a feature of this invention that the resultant fields thus produced establish a condition of magnetic saturation in one direction in a particular one only of the sections or legs as determined by the binary information values to be translated. This is obviously a modification of the operation of magnetic principles generally. According to the principles of combining magnetic fields, the fields ordinarily augment each other in two opposing quadrants defined by the energized intersecting conductors and oppose each other in the other two quadrants. Thus, in the ordinary case, assuming complete flux paths between each of the sections or legs occupying the quadrants, two, not one, of the sections would be magnetically saturated in opposite directions.

The restrictive operation of the orthogonal fields above described is accomplished in accordance with another feature of this invention whereby a clearing or switching conductor is inductively coupled to each section or leg of the magnetic element. This coupling is such that when a switching current is applied to the conductor, each leg of the element is driven to a condition of magnetic saturation in a particular direction. The initial remanent magnetization in each of the legs and its direction prevents the normal cooperation of the orthogonal fields generated by subsequent current pulses on the intersecting input conductors and determines the path of any flux induced in the element by those input current pulses. The switching or clearing current pulse thus initially prepares the element for the introduction of the binary input variables.

When input current pulses representing binary values are applied to the intersecting input conductors the flux thus generated is caused to pass in one direction substantially completely through one of the sections or legs and divides in the opposite direction through two adjacent legs as controlled by the above-described initial magnetic conditions of the legs. As a result of the initial magnetic condition of the legs and the operation of the subsequently generated flux the remanent magnetization of one of the legs will be completely switched, the two adjacent legs will be partially switched, and the opposite leg will be unaffected. In the four-section solid of this illustrative embodiment four distinct magnetic conditions are thus conveniently made available; one for each of the sections or legs the magnetization of which is completely switched by the complete flux passing through it as determined by the polarity of the input current pulses applied to the input conductors. The substantially complete flux in any section or leg may advantageously be designated as a "set" state in accordance with analogous toroidal magnetic core terminology. Since each section is thus independently responsive to applied switching currents, the four distinct magnetic conditions or "set" states are available to represent information values for translating purposes.

When the information stored in the element of this invention is to be read out, a switching current pulse is applied to the switching conductor to restore each of the legs to the initial magnetic conditions. The "set" leg, as a result, will again be completely switched or "reset," the two adjacent legs will again be partially switched, and the opposite leg will again be unaffected since, it will be recalled, that leg was not driven from its initial magnetic condition. Thus it should be noted that, as a result of the particular coupling of the switching conductor, the magnetomotive force generated by the switching current will always be opposite in direction to that of the substantially complete flux in a "set" leg. The switching magnetomotive force thus switches or "resets" the one leg and at the same time magnetically prepares the sections to again control the division of the flux induced by subsequent information input current pulses on the input conductors.

According to still another feature of this invention individual read-out conductors are also inductively coupled respectively to the legs of the magnetic element. When the magnetic condition of a particular leg is completely switched responsive to an applied switching current, a read-out voltage will be induced in the particular inductively coupled read-out conductor, which read-out voltage is finally directly representative of the information stored in the element. Obviously, the partial switching of the two adjacent legs will also induce output voltages in the respective read-out conductors. However, the relative magnitudes of the true output voltage and the incidentally induced voltages is such that discrimination between these signals may be readily accomplished.

Figure 2:
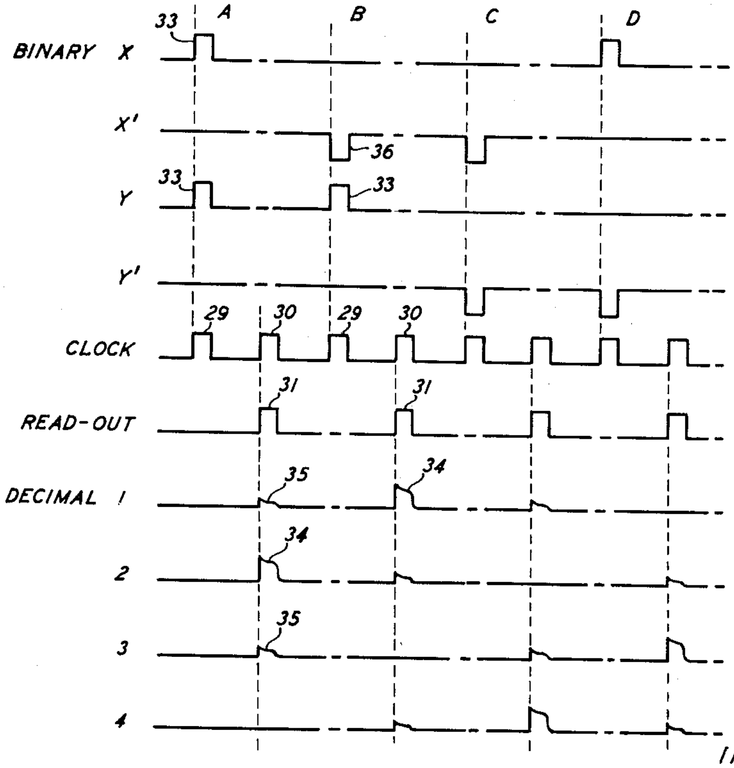

A complete understanding of the above and other objects and features of this invention together with its organization and structure can be gained from a consideration of the detailed description thereof which follows when taken in conjunction with the accompanying drawing in which:

Fig. 1 is a block diagram of a translating arrangement in accordance with the principles of this invention in which an illustrative magnetic element, which is shown in its entirety in Fig. 3, is broken along the line 1—1 of Fig. 3 to show the details of the wiring;

Fig. 2 shows the current and voltage pulses in ideal form representing input and output information of an illustrative group of translations possible with this invention. Also shown are read-out pulses and clock pulses, the latter of which may be used to control the switch for periodic operation; and Fig. 3 shows in perspective view an illustrative magnetic element employed in the arrangement of Fig. 1.

An illustrative magnetic memory element according to the principles of this invention is utilized to realize the translating arrangement shown in Fig. 1 of the drawing. The memory element 10 is shown for convenience as a three-dimensional rectangular solid and is formed of a ferrite material displaying a substantially rectangular hysteresis characteristic. Thus a remanent magnetic condition may be induced in the solid by an applied magnetomotive force. Although the element 10 is shown as a rectangular solid it is to be understood that any three-dimensional configuration may be used to practice this invention. A pair of slots 11 and 12 intersecting each other pass completely through the body of the element 10 and, in the illustrative embodiment shown, divide the element 10 into four sections. These sections thus advantageously form four members 13, 14, 15, and 16, each separately and individually magnetizable by applied magnetomotive forces. For the most advantageous operation of this invention the cross-sectional dimensions of the members 13 through 16 are substantially equal.

The four-member element 10 has threaded through its slots 11 and 12 in an orthogonal arrangement a plurality of insulated operating conductors including a pair of input conductors 17 and 17', each of which input conductors is connected at one end to ground and at the other end to a source of input information current pulses 18. The current pulses may represent illustrative variables in one system of notation which may be translated in the switch of the present invention. The polarities and values represented by the current pulses will be considered in greater detail hereinafter. Also threading the slots 11 and 12 is a switching conductor 19 also connected at one end to ground and at the other end to a read-out or switching current pulse source 20. The switching conductor 19 threads the slots 11 and 12 of the element 10 in a manner such as to substantially parallel adjacent legs of the orthogonal input conductors 17 and 17'. As a result the switching conductor 19 passes parallel to opposing legs of each of the conductors 17 and 17' in opposite directions.

The output stage of the switch includes an output conductor inductively coupled to each of the members 13, 14, 15 and 16. Thus the member 13 has coupled thereto an output conductor 21, the member 14 has coupled thereto an output conductor 22, the member 15 has coupled thereto an output conductor 23, and the member 16 has coupled thereto an output conductor 24. Each of the conductors 21 through 24 threads the adjacent portions of the slots 11 and 12 which delineate respectively the members 13 through 16 and each is connected at one end to ground and at the other end to sensing amplifier means 25. The amplifier means 25 may conveniently comprise any suitable amplifier means well known in the art capable of separately amplifying signals appearing on the output ends of the conductors 21 through 24 and making available amplified output signals on the terminals 1 through 4 associated with the conductors 21 through 24, respectively.

To control the timing of the introduction of the input variables to the input conductors 17 and 17' and the application of the read-out or switching current pulse to the switching conductor 19 a clock pulse source 26 may conveniently be provided. Such a clock pulse source 26 is also well known in the art and produces periodic output pulses of suitable polarity and magnitude to alternately control the information source 18 and read-out pulse source 20 via conductors 27 and 28, respectively. It is to be understood, however, that, according to the principles of this invention, the switch need not necessarily be operated in such periodic fashion. Thus, the source 18 need not be operated under the control of the clock pulse 29 and the read-out pulse source 20 may be operated manually or otherwise to read out the information stored in the element 10 at any time subsequent to its introduction.

In the foregoing detailed description of the organization and structure of an illustrative embodiment of this invention, a three-dimensional rectangular solid having intersecting slots therethrough is contemplated. It is to be understood, however, that the intersecting operating conductors may be fabricated as integral parts of the solid element 10 without there then being necessity for the slots 11 and 12. The arrangement of the intersecting conductors in such a fabrication will still divide the solid physically and functionally into the separately magnetizable members 13 through 16 as will become clear from the consideration of the operation of the invention provided below.

Assume, for purposes of description, the condition of the members 13 through 16 of the element 10 as that immediately following the application of a switching pulse from the read-out pulse source 20 to the switching conductor 19. Such a pulse is positive and is shown in ideal form in the pulse chart of Fig. 2 as one of the pulses 31. The pulses 31 are shown as periodic in accordance with the illustrative periodically interrogated embodiment being described. Reference may also be had to the chart of Fig. 2 in connection with the following description of further operative steps of this invention. The application of the pulse 31 to the conductor 19 develops a magnetic field which drives each of the members 13 through 16 to conditions of remanent magnetization as indicated on the element 10 in Fig. 1 of the drawing by the arrows 32. This is obviously in accord with the well-known right-hand rule and the members 13 through 16 are now in a state preparatory to the introduction therein of the binary information values to be translated.

Binary variables $xx'$ and $yy'$ are introduced into the storage element 10 from the information source 18 via the conductors 17 and 17', respectively. The variables appear respectively on the single conductors 17 and 17' in the form of positive and negative current pulses of suitable magnitude, in this embodiment under the control of a clock pulse 29 from the source 26. Assume by way of illustration that the binary variables $xy$ are to be translated: as shown in Fig. 2 under column A, positive pulses 33 in this case are applied simultaneously on the conductors 17 and 17'. The direction of the magnetic fields produced by the currents in these conductors will be such that the magnetic flux in the member 14 will be driven to the direction opposite to that indicated in Fig. 1 by the arrow 32. In accordance with magnetic principles generally the magnetic fields produced by the currents in the conductors 17 and 17' would augment each other in the members 14 and 16 and would oppose each other in the members 13 and 15. The flux paths would then be completed through the opposite members 14 and 16. However, the preparatory clearing or switching pulse 31 has already driven the member 16 to magnetic saturation in the direction of the flux presently being induced, and accordingly the flux reversing the magnetization of the member 14 will not be completed through the member 16 but rather will divide through the adjacent members 13 and 15. The latter members will partially reverse to a magnetic direction opposite to that indicated by the arrows 32.

To recapitulate, in the illustrative operation being described, before the application of a switching pulse 31 to the element 10, as a result of the information previously introduced, the members 14 will be in a condition of magnetic remanence opposite to that indicated by the arrow 32, the members 13 and 15 will be partially switched in a magnetic direction opposite to that indicated by the arrows 32, and the member 16 will be unaffected by introduction of the variables $xy$. The readout pulse source 20, energized in this embodiment responsive to a clock pulse 30 from the clock pulse source 26, now applies a switching pulse 31 to the switching conductor 19. The magnetic field produced by the current pulse 31 is such as to drive the members 13 through 16 to the condition of magnetic remanence as indicated by the arrows 32 and as described above in connection with the preparatory clearing operation. The member 14 accordingly undergoes a complete reversal of magnetic direction, the members 13 and 15 undergo only partial reversal, and the member 16 in this case remains unaffected. In accordance with the magnetic excursions just described, a full output voltage pulse will be induced in the output conductor 22 inductively coupled to the member 14, this pulse being indicated in column A of Fig. 2 as pulse 34. Partial output pulses will be induced in the output conductors 21 and 23 inductively coupled to the members 13 and 15, respectively, these pulses also being shown in column A of Fig. 2 as the pulses 35. Since no excursion of the flux took place in the member 16, no output voltage is induced in the output conductor 24 inductively coupled to that member.

Output voltages appearing on the conductors 21 through 24 are made available after suitable amplification in the amplifier means 25, on the output terminals 1 through 4 so designated in accordance with the illustrative decimal translations possible with the switch being described. Obviously, since output voltages of different magnitudes are generated during each switching operation the amplifier means 25 must discriminate between the true output voltage pulses resulting from complete flux reversals in the members and output pulses resulting from the partial switching of members. Such discrimination is readily accomplished in practice; the relative magnitudes of these pulses was found to be in the order of approximately 2:1 for the pulses 34 and 35, respectively. The ratio of output voltages induced may advantageously be rendered more favorable by applying an opposing voltage to auxiliary windings, not shown in the drawing, inductively coupled to each of the members 13 through 16. Thus, discrimination between output voltages may be facilitated in such a case with possible output voltage ratios of 1½:½:½:—½ where the opposing voltage is 25% of the true output volatge pulse desired. The information representative output voltage pulse 34 thus appearing on the conductor 22 is made available, after amplification to a suitable level, on the output terminal 2. A representative translation from the binary variables $xy$ to a decimal "2" has thus been described. It should be noted that, although the binary values assigned as correlatives to the corresponding decimal values are not those conventionally assigned as such, a conventional translation can readily be accomplished by simply reassigning output conductors to the several members of the element 10.

Translations to other decimal values such as 1, 3, and 4 are accomplished in a manner similar to that described for the value 2 and are represented in columns B, C and D of Fig. 2. Thus for a translation to the value "1" in the particular embodiment described above, the variables $x'y$ are introduced by means of a negative input pulse and a positive input pulse simultaneously applied on the conductors 17 and 17' respectively. The magnetic fields generated by these current pulses coact in accordance with magnetic principles as hereinbefore described to completely reverse the magnetic direction of member 13, partially reverse members 14 and 16 and leave the member 15 in its initial magnetic condition. The pulses representing the values $x'y$ are shown in the chart of Fig. 2 as the pulses 36 and 33, respectively, in column B. Upon the application of a switching current pulse 31 a full magnitude output voltage pulse 34, also shown in column B will be induced in the output conductor 21 by the complete magnetic reversal of the member 13, this output voltage appearing, after amplification, as representative of the decimal value "1" on the output terminal 1. Further translations may be accomplished in an identical manner and as determinable from a reference to the pulse chart of Fig. 2.

The illustrative embodiment of Fig. 1 is shown as having only four members 13 through 16 thereby being capable of a translation to decimal values up to the number 4. It should be understood however that a rearrangement of the energizing conductors may divide the element 10 into more than four even-numbered members. The range of possible translations may in this manner be extended and other embodiments performing such further translations are understood to fall within the principles of this invention. What has been described is thus considered to be only one illustrative embodiment of the principles of this invention and it is to be understood that numerous other arrangements than the ones described may be devised by one skilled in the art without departing from the spirit and scope of this invention.

What is claimed is:

1. A magnetic memory element comprising a plurality of magnetizable members each having a substantially rectangular hysteresis characteristic, said members having longitudinal axes substantially parallel and being associated in a cluster, means at each end of said members for completing a plurality of magnetic flux paths between each of said members and each of the others of said members, means for inducing a magnetic flux in a particular one of said members in one direction comprising a pair of intersecting conductors passing between said magnetizable members to divide said cluster into quadrantal sectors and means for applying current pulses to said intersecting conductors, said intersecting conductors being inductively coupled to magnetizable members including said particular one of said members lying in said quadrantal sectors so that said current pulses combine to produce a magnetic field in the flux path including said one member, means including a switching conductor coupled to each of said flux paths for switching the magnetic flux in said particular one of said members to the opposite direction, and an output conductor inductively coupled to said particular one of said members.

2. A magnetic memory element comprising a magnetizable solid having a substantially rectangular hysteresis charactertistic and having a pair of intersecting slots therein, said slots dividing said solid into a plurality of individually magnetizable members, a pair of intersecting conductors respectively threading said slots, means including a current pulse source for selectively applying current pulses to said intersecting conductors to induce a remanent magnetization in one direction in one of said members, a switching conductor threading said pair of intersecting slots, means including a second current pulse source for applying a switching current pulse to said switching conductor, said switching conductor being arranged in said intersecting slots such that said switching current pulse drives all of said members to predetermined conditions of remanent magnetization, said one member being driven to a remanent magnetization in the opposite direction, and an output conductor inductively coupled to each of said members.

3. A magnetic memory element comprising a plurality of magnetizable members each having a substantially rectangular hysteresis characteristic, said members having longitudinal axes substantially parallel and being associated in a cluster, means for completing a magnetic flux path through more than one of said members, a pair of input conductors passing between said magnetizable members to divide said cluster into quadrantal sectors, means including a current pulse source for applying current pulses to said input conductors, said input conductors being coupled to each of said members including a particular one of said members lying in said quadrantal sectors so that said current pulses combine to induce a magnetic flux in said flux path and in said particular one of said members in one direction, a switching conductor, means including a second current pulse source for applying a switching current pulse to said switching conductor, said switching conductor being coupled to each of said plurality of members so that said switching current pulse induces a magnetic flux in said particular one of said members in the opposite direction, and an output conductor inductively coupled to each of said plurality of members.

4. A magnetic memory element comprising a magnetizable solid having a substantially rectangular hysteresis characteristic, a plurality of orthogonal input conductors passing through said solid, means for selectively applying input currents to an orthogonal pair of said input conductors to magnetize said solid in a particular flux pattern lying between said pair of input conductors, means for rearranging said flux pattern, and a plurality of output conductors inductively coupled respectively to each portion of said solid lying between said pair of orthogonal input conductors.

5. A magnetic memory element as claimed in claim 4 in which said means for rearranging said flux pattern comprises a switching conductor passing through said solid parallel to a leg of each conductor of said orthogonal pair of input conductors and means for applying a switching current to said switching conductor.

6. A magnetic memory element comprising a magnetizable solid having a substantially rectangular hysteresis characteristic, said solid being divided into discrete sectors, a plurality of input conductors intersecting each other and passing through said solid between said discrete sectors, means for selectively applying current pulses to said input conductors to induce a remanent magnetization in a particular one of said discrete sectors in one direction, a switching conductor intersecting said solid parallel to each of said intersecting input conductors, means for applying a switching current pulse to said switching conductor to switch said remanent magnetization to the opposite direction, and a plurality of output conductors individually coupled respectively to said discrete sectors.

7. A translating switch comprising a magnetizable solid having a substantially rectangular hysteresis characteristic, said solid being divided into discrete sectors, a plurality of input conductors intersecting each other and passing through said solid between said discrete sectors, means for selectively applying current pulses to said input conductors to induce remanent magnetizations in one direction in said sectors in accordance with input variables in one notation, a switching conductor passing through said solid, means for applying a switching current to said switching conductor, said switching conductor being coupled to each of said sectors so that said switching currents switch said remanent magnetizations to the opposite direction, and output conductors inductively coupled respectively to said sectors having output voltages induced thereon by the switching of said remanent magnetizations representative of said input variables in another notation.

8. A translating switch as claimed in claim 7 wherein said switching conductor passes through said solid parallel to one pair of legs of two intersecting input conductors in one direction and parallel to the other pair of legs of said two intersecting input conductors in the opposite direction.

9. A translating switch comprising a multi-section memory device, each section having a substantially rectangular hysteresis characteristic, a first and a second input conductor, said input conductors intersecting between pairs of said sections, means for selectively applying coincident currents to said first and second input conductors, said currents producing a magnetic field to induce a particular remanent magnetization in one direction in one section of one of said pairs of sections representative of binary input variables, a switching conductor arranged parallel to one pair of legs of said first and said second input conductors in one direction and parallel to the other pair of legs of said first and said second input conductors in the opposite direction, means for applying a switching current to said switching conductor for reversing said remanent magnetization in said one section, and an output conductor inductively coupled to said one section energized responsive to said reversing of said remanent magnetization for generating an output voltage representative of said binary input variables in decimal notation.

10. A translating switch as claimed in claim 9 in which said multi-section memory device comprises a solid having a plurality of intersecting slots therein, said slots dividing said solid into a plurality of said sections, and having each of said input and switching conductors threading said slots.

11. A translating switch as claimed in claim 9 in which said multi-section memory device comprises a solid having the conductors imbedded therein, the arrangement of the conductors dividing said solid into a plurality of said sections.

12. A translating switch as claimed in claim 9 also comprising means for completing a magnetic flux path between pairs of said sections.

References Cited in the file of this patent

UNITED STATES PATENTS

| | | |
|---|---|---|
| 2,810,901 | Crane | Oct. 22, 1957 |
| 2,850,722 | Loev | Sept. 2, 1958 |
| 2,919,430 | Rajchman | Dec. 29, 1959 |

OTHER REFERENCES

"The Transfluxor" by J. A. Rajchman and A. W. Lo, Proceedings of the IRE, March 1956, pp. 321 to 332.